United States Patent [19]

Hamilton et al.

[11] Patent Number: 4,819,237
[45] Date of Patent: Apr. 4, 1989

[54] METHOD AND APPARATUS FOR MONITORING THE VALIDITY OF MICROPROCESS OR VOLATILE MEMORY

[75] Inventors: James E. Hamilton, Hoffman Estates; Gregory A. Peterson, South Barrington, both of Ill.

[73] Assignee: Digital Appliance Controls, Inc., Hoffman Estates, Ill.

[21] Appl. No.: 82,075

[22] Filed: Aug. 5, 1987

[51] Int. Cl.$^4$ ............................................. G06F 11/00
[52] U.S. Cl. ..................................... 371/66; 364/200; 364/900; 371/16
[58] Field of Search ................. 371/66, 12, 13, 16, 371/62; 365/228, 229; 324/73 R; 364/200 MS File, 900 MS File

[56] References Cited

U.S. PATENT DOCUMENTS

| | | | |
|---|---|---|---|
| 4,384,350 | 5/1983 | Lee et al. | 365/229 |
| 4,393,481 | 7/1983 | Owen et al. | 365/228 |
| 4,422,163 | 12/1983 | Oldenkamp | 365/229 |
| 4,531,214 | 7/1985 | Torres et al. | 371/66 |
| 4,683,568 | 7/1987 | Urban | 371/66 |

FOREIGN PATENT DOCUMENTS

| | | | |
|---|---|---|---|
| 2900955 | 8/1979 | Fed. Rep. of Germany | 365/228 |
| 52-33435 | 3/1977 | Japan | 365/228 |
| 02463 | 7/1982 | PCT Int'l Appl. | 365/228 |

Primary Examiner—A. D. Pellinen
Assistant Examiner—Geoffrey S. Evans
Attorney, Agent, or Firm—Buchanan Ingersoll

[57] ABSTRACT

A microcomputer of a household appliance, such as a microwave oven, receives input data from the user for operating the various functions of the appliance. The data is stored in the volatile memory of the microcomputer. The data is compressed into a bit pattern which is representative of all the bits in the volatile memory in the event of a power interruption. The compressed bit pattern is stored in the volatile memory of the microcomputer to be later verified. The operations of the microcomputer is continued for those functions which do not affect volatile memory until the power source is restored or the microcomputer is reset. In either case the volatile memory is verified by generating a compressed bit pattern for current data. The current bit pattern is then compared to an initial bit pattern. If the bit patterns are identical then the volatile memory has not been corrupted by an interruption of power exceeding a preselected "data vaild time". Also the fixed bit pattern is verified against a fixed bit pattern in nonvolatile memory to determine if any corrpution has occurred. If no corruption has occurred the normal operations continue. If it has been determined that the volatile memory has been corrupted, then the microcomputer is reinitialized with default data copies from nonvolatile memory to volatile memory.

20 Claims, 3 Drawing Sheets

METHOD AND APPARATUS FOR MONITORING THE VALIDITY OF MICROPROCESS OR VOLATILE MEMORY

BACKGROUND OF THE INVENTION

1. Field of the Invention

This invention relates to method and apparatus for verifying the validity of data stored in the volatile portion of the memory of a microprocessor, and more particularly to a method for extending the valid data time in the event of a power failure by verification of the integrity of volatile memory in a microprocessor of an electrical appliance.

2. Description of the Prior Art

With the increasing number of user programmable memory features in electrical appliances, such as time of day clocks, microwave ovens, dishwashers, and the like, it has become increasingly more important to survive momentary power interruptions to avoid the loss of user data supplied to the volatile memory of the microprocessor which controls the functions of the electrical appliance. This problem is found in all microprocessor/computer based systems, as well as, automotive accessories where there is a need to retain user enter data for as long as possible in the event of power interruption so that the system survives the interruption without the loss of user entered data. The loss of the user entered data requires that the user re-enter the data in the volatile memory.

In the appliance industry where the power source is an A.C. power line, it is usually required that the data stored in the volatile memory of the microprocessor by the user survive a power interruption of at least five seconds before the data has become corrupted. Studies have revealed that approximately 87% of all power interruptions are five seconds or less. This five second interval is known as the minimum "keep alive time" or the "data valid time". This time interval extends from the time when the main power source is interrupted to the point where user entered data in the volatile memory becomes invalid. The volatile memory can be corrupted by power interruption, power supply sagging, or power source transients.

It is the conventional practice to provide a five second minimum "data valid time" by large capacitors, batteries, or alterable nonvolatile memories (EE-PROMS) which are expensive additions to digital controls. The conventional methods generally include very expensive material costs and require considerable engineering time to minimize material cost and obtain dependable results. Large electrolytic capacitors are the most common method for providing the minimum five second "data valid time".

Microcomputer manufacturers commonly define a threshold voltage below which the volatile memory is to be considered invalid. The volatile memory is commonly a CMOS static random access memory (RAM). Also in combination with large capacitors, it is known to detect a supply voltage level which places the microprocessor or microcomputer in a reset mode. This voltage level is well above the point at which the microcomputer manufacturer considers data in the volatile memory to become invalid but at any rate is accepted as the point at which data is invalid. This is done primarily to obtain a desired margin in design safety. When the main power source resumes the microcomputer is released from the reset mode and begins by initializing volatile memory, solely because the supply voltage has dropped below a predetermined level.

With the above known approach there is no regard for the actual state of the volatile memory. In many cases the memory is still valid, but is destroyed due to ignorance rather than the fact that the volatile memory is actually invalid.

While there have been proposed a number of methods for determining the point when data in the volatile memory becomes invalid, there is a need for a lower cost system with improved "data valid time". There is also a need that this method or apparatus to extend "data valid time" have improved tolerance of parameter variation so as to reduce system development costs. That is, to eliminate the need for testing and customization to each application. Previous methods have relied on measurement of a parameter such as power supply voltage and comparison to a fixed target which is an abstract and indirect approach. It is more flexible and efficient to determine data validity by integrating memory directly. Considering the fact that the volatile data memory remains valid to a much lower voltage level than conventionally specified by current microprocessor manufacturers. Therefore there is need to avoid the conventional practice of invalidating data beyond a certain supply voltage level well before the data in volatile memory actually becomes invalid. There is further need to extend the "data valid time" by verifying the memory in a microprocessor after a power outage rather than automatically assuming after a preselected period of time hat it is invalid.

SUMMARY OF THE INVENTION

In accordance with the present invention there is provided a method for extending valid data time on power failure by verification of volatile memory in a microprocessor that includes the steps evaluating status (presence or absence) of power supplied to a microprocessor system. In the event that the main power source to the system is determined to be absent, an initial compressed bit pattern is generated and is representative of all bits of data entered into a volatile portion of the memory of the microprocessor. The initial compressed bit pattern is stored in a nonverified portion of the volatile memory in a microprocessor for future reference. A fixed bit pattern was previously copied from nonvolatile memory to volatile memory when volatile memory was initialized. This fixed bit pattern resides, as the user entered data, in volatile memory. The microprocessor is reset or determines that the main power source has been restored. A current compressed bit pattern is generated representative of the current data processing operations entered in the volatile portion of the memory. The current compressed bit pattern is compared with the initial compressed bit pattern. Volatile memory is initialized if the compressed bit patterns are not identical. This results from the volatile memory being invalid. Conversely, a fixed bit pattern in volatile memory is then compared to a fixed bit pattern in nonvolatile memory as a second evaluation to determine validity of volatile memory. The data processing operations continue as long as the fixed bit patterns are identical. Successful completions of both comparisons implies that the volatile memory has not been corrupted by the extent of the power interruption. Processing of application specific functions begin and is repeated continually until a power failure is again detected.

Further in accordance with the present invention there is provided a method of verifying the validity of data stored in the volatile portion of the memory of a microprocessor that includes the steps of resetting a microprocessor having volatile and nonvolatile memory to execute data processing functions. An initial compressed bit pattern corresponding to the selected data processing functions is stored in the volatile memory. A recently compressed bit pattern is compared with the initial compressed bit pattern stored in the volatile memory. A fixed bit pattern is copied from the nonvolatile memory to the volatile memory in the event the recently compressed bit pattern differs from the initial compressed bit pattern. The data processing function is executed using the data copied or generated from the nonvolatile memory. A periodic interruption in the power supplied to the microprocessor is detected. A compressed bit pattern corresponding to the executed data processing functions is generated in the event of a periodic interruption in the supply of power to the microprocessor. The compressed bit pattern is then stored in a nonverified section of the volatile memory. The restoration of the power to the microprocessor is sensed. The microprocessor is reset for data processing functions as directed by the stored compressed and fixed bit pattern in the event the power is interrupted for an undesirable period of time.

Additionally, the present invention is directed to a control system for maintaining operation of an electrical appliance for a minimum preselected period of time following power interruption that includes a microprocessor for controlling the functions of an electrical appliance. A power source supplies an unregulated voltage to the microprocessor system. The microprocessor has a volatile memory capable of storing data for a minimum preselected period of time following interruption of the unregulated voltage. A source of regulated voltage is provided. A voltage comparator has a first input terminal, a second input terminal, and an output terminal. The first input terminal is connected to the unregulated voltage, and the second input terminal is connected to the regulated voltage. The comparator output terminal is connected to a microprocessor to supply the microprocessor with a voltage at a first level for execution of functions corresponding the data stored in the volatile memory. The comparator output terminal is biased at the first voltage level as long as the magnitude of the unregulated voltage supplied to said first input terminal exceeds the magnitude of the regulated voltage applied to the second input terminal. The comparator is switched from the first voltage level to a second voltage level when the magnitude of the unregulated voltage applied to the first input terminal exceeds the magnitude of the second regulated voltage applied to the second input terminal. The comparator is switched to the second voltage level to maintain the integrity of the volatile memory in a microprocessor for a minimum preselected period of time before the volatile memory is destroyed.

Accordingly, the principal object of the present invention is to provide method and apparatus for extending the minimum period of time for preserving the volatile memory in a microprocessor in the event of a power failure.

Another object of the present invention is to provide an improved method and apparatus for verifying the integrity of volatile memory in a microprocessor control in the event of power interruption.

A further object of the present invention is to provide a microprocessor control system that provides a greater "data valid time" in which data stored in the volatile memory can survive a power failure without becoming invalidated or corrupted.

These and other objects of the present invention will be more completely disclosed and described in the following specification, the accompanying drawings, and the appended claims.

DESCRIPTION OF THE PREFERRED EMBODIMENTS

Figure 1:
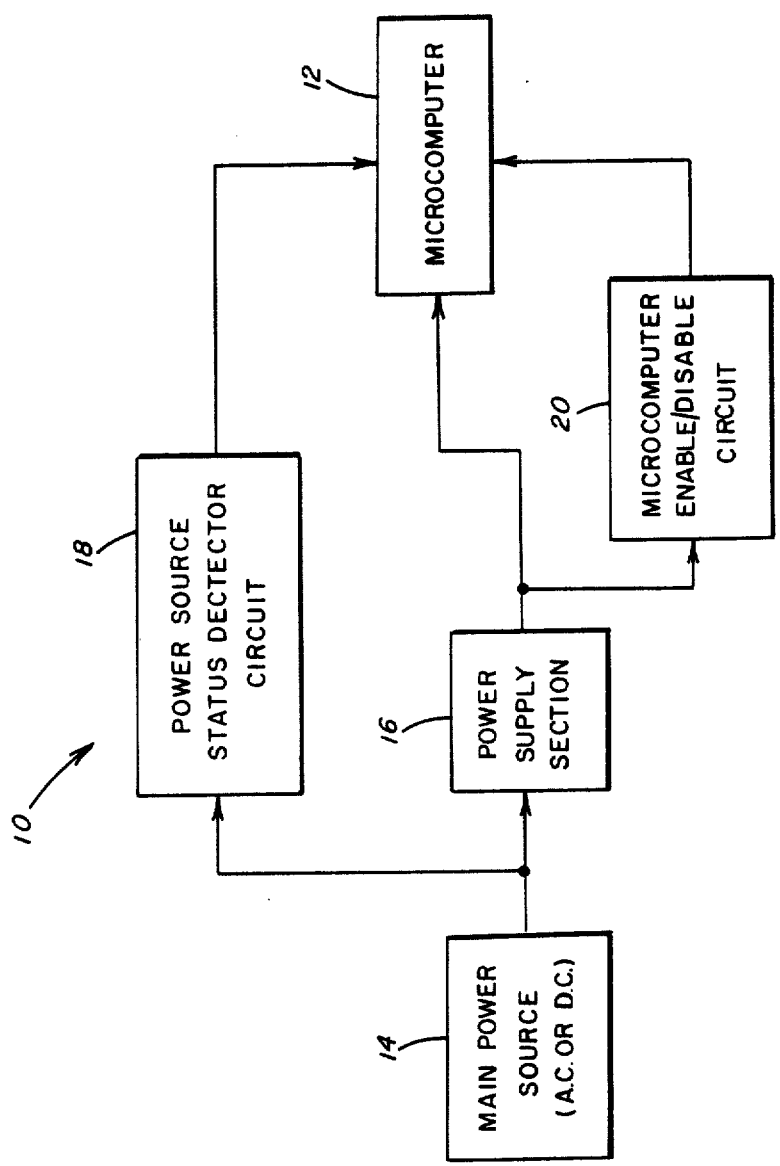
FIG. 1 is a diagrammatic illustration of the general components for the integrity of the data stored in the volatile memory of a microprocessor in the event of a power outage.

Referring to the drawings and particularly to FIG. 1, there is diagrammatically illustrated the components of a control system generally designated by the numeral 10 for verifying the validity of data stored in the volatile memory of a microcomputer 12 in the event of an interruption in the supply of power to the microcomputer 12 from a main power source 14. The power source 14, either A.C. or D.C., is supplied to the microcomputer 12 through a power supply section 16 and also through a power source status detector 18. In addition output from the power supply section is directed to the microcomputer 12 and also through a microcomputer enable/disable circuit 20 to the microcomputer 12.

The power source status detector 18 is a circuit element that generates an output signal to the microcomputer 12 when the supply of power from the source 14 is interrupted. In response to the signal from the detector 18, the microcomputer 12 ceases its normal operations in controlling the various machine functions, such as those functions inherent with a programmable household appliance. The microcomputer 12 ceases normal operations to verify the validity of the volatile memory stored in the microcomputer 12 when the microcomputer 12 is later actuated to begin its normal functions.

In the context of the present invention, volatile memory is considered static random access memory (SRAM). The volatile memory is divided into a verified portion and an unverified portion. The unverified volatile memory is reserved for the storage of a compressed bit pattern. A compressed bit pattern is a binary number that is generated by known programmable techniques, such as checksumming, parity checking, or one of the many other techniques for data compression. In the present invention the compressed bit pattern is generated by checksumming. In this context, the unverified volatile memory is reserved for storage of the compressed bit pattern, as well as, a fixed bit pattern and other working space when generating a new or recent compressed bit pattern for comparison as will be explained later in greater detail.

Also in the context of the present invention, a fixed bit pattern, also known as a signature, is a binary pattern copied from nonvolatile memory to volatile memory for the purpose of comparison in case all locations of volatile memory are zero implying a checksum of zero. The determination of when the microcomputer 12 should return to normal operations is accomplished by line voltage zero cross detection since the main power source 14 is a conventional household alternating current line.

The present invention in one embodiment has application in automotive ignition control or automotive accessories in general. In this respect the automobile ignition switch is monitored. When the switch is off, the microcomputer is commanded to conserve power. Prior to being actuated it is verified that the volatile memory is still retained. In this manner, battery life is extended particularly when the automobile is left for extended periods of time without recharging the battery.

The microcomputer enable/disable circuit 20 is operable to externally halt operation of the microcomputer 12, as well as, actuate the microcomputer 12 to again begin processing data when the power conditions are satisfactory. The operation of the microcomputer 12 is effective to prevent modification of the volatile memory, when in fact the voltage level is well above the point at which the volatile memory of the microcomputer 12 becomes invalid. Thus no volatile memory modifications to the microcomputer 12 are executed until the volatile memory of the microcomputer 12 is verified after supply of power from the source 14 is restored.

The power supply section 16 is provided with means for storing energy for those periods of time in which the supply of power from the source 14 is interrupted. The stored energy from section 16 is supplied to the microcomputer 12 during the period of time in which power has temporarily been interrupted. The power is delivered at a much lower rate of consumption than ordinarily supplied to the microcomputer 12 from the source. Thus the power supply section 16 serves as an interface between the main power source 14 and the remainder of the system.

Figure 2:
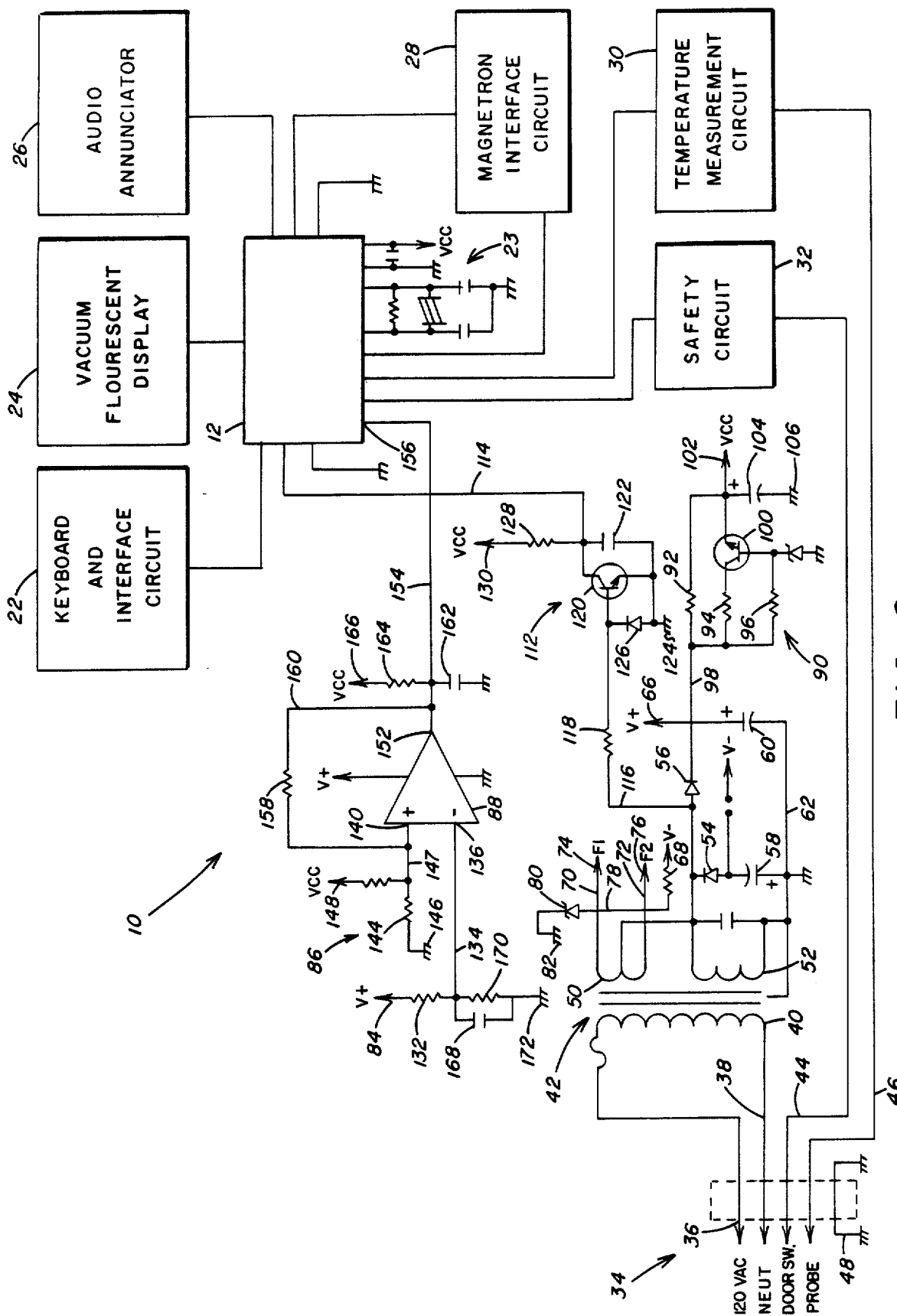
FIG. 2 is an electrical schematic of the circuitry for extending the "data valid time" for volatile memory in a microprocessor upon the temporary interruption of power.

Now referring to FIG. 2 there is shown in detail the control system 10 that includes the basic components shown in FIG. 1 for detecting low voltage or interruption of voltage to microcomputer 12. For the purposes of illustration in the present invention the microcomputer 12 is a microprocessor containing static random access volatile memory. A commercially available microprocessor suitable for use with the present invention is manufactured and sold by Hitachi, model HCMS 402C. Further the microcomputer 12 is shown in FIG. 1 as a microwave oven control where, for example, the time of day clock and any operations that are programmed would be affected by a power failure.

By utilization of the control system 10 of the present invention these programmable operations are not affected by a power failure of five seconds or less. This period of time is known as the "data valid time" for the interval from when the main power source becomes absent to the point where the data in the volatile memory of the microcomputer 12 becomes invalid. With the known prior art control systems for microwave ovens, it is a common practice to accept survival of power interruptions of only a quarter second or less. This is due to the cost of increasing the time with current techniques.

The control system 10 of the present invention illustrated in FIG. 2 is applied to a microwave oven in which the microcomputer 12 or microprocessor controls the various circuits of the system. The circuits controlled by the microcomputer 12, as shown in FIG. 2, include the keyboard and interface circuit 22, the vacuum florescent display 24, audio annunciator 26, magnetron interface circuit 28, temperature measurement circuit 30, safety circuit 32, and oscillator circuit 33. These respective circuits are well known in the art and will not be described in detail.

The main power source is conventional household current applied at a 120 volts A.C. at a frequency of 60 Hz. The power source is supplied at input terminal generally designated by the numeral 34 to conductors 36 and 38 of primary winding 40 of a step down transformer generally designated by the numeral 42.

The power supplied to the system 10 from the input terminal 34 is both regulated and unregulated direct current. Low voltage alternating current is derived from transformer 42 an rectified by diodes 54 and 56 connected to the transformer windings 50 and 52. Capacitors 58 and 60 are connected to conductor 62 across the secondary winding 52 and serve as a filter for rectified voltage V− and V+ at terminals 64 and 66. Terminal 64 is connected through resistor 68 to the secondary winding 50. Terminal 66 is connected by conductor 62 through the capacitor 60 to the secondary winding 52.

Power is also supplied from the secondary winding 50 through conductors 70 and 72 to the terminals 74 and 76 respectively. The terminals 74 and 76 are connected to the vacuum florescent display 24. In this manner, power is supplied for illuminating the display. In addition, conductor 72 from secondary winding 50 is connected by conductor 78 through zener diode 80 to ground 82. Voltage V− is supplied for both the vacuum florescent display 24 and the magnetron interface circuit 28. Voltage V+ is supplied to terminal 84 of a reset circuit generally designated by the numeral 86. In addition voltage V+ is supplied to the safety circuit 32 and the audio annunciator 26.

A series pass voltage regulator generally designated by the numeral 90 includes resistors 92, 94 and 96 which are connected by conductor 98 to the secondary winding 52. With this arrangement V+ current is fed to the series pass voltage regulator 90 which is controlled by a transistor 100 having a collector connected to resistor 94 and an emitter connected to terminal 102 for supplying voltage at $V_{cc}$. The transistor emitter is also connected to voltage storage capacity 104 and ground 106. The base of transistor 100 is connected to resistor 96 and zener diode 108 and ground 110. Resistor 94 connected to the collector of transistor 100 serves as a pre-regulator dropping resistor which serves to dissipate power for transistor 100. Resistor 92 provides a bypass current path for reducing heat dissipation required of transistor 100. The resistor 96 supplies bias current for transistor 100 and the zener diode 108 which serves as a voltage reference. The capacitor 104 filters output of the voltage regulator and provides stored energy when the supply of power to the main input terminal is interrupted.

The basic operations performed by the microcomputer 12 include an update of the display 24, checking the keyboard and interface circuit 22 for new entries, and control of the magnetron interface circuit 28. After these normal system checks are completed, the microcomputer 12 checks to determine if a power failure has occurred. This condition is detected by the absence of a zero crossing signal as detected by the zero cross sensing circuit generally designated by the numeral 112. The circuit 112 generates a signal through conductor 114 to the microcomputer 12 to provide the microcomputer 12 with input indicating that supply of power from the main power input terminal 34 has been interrupted. Also in this manner, the microcomputer 12 is commanded to stop normal operations and verify volatile memory when called upon to initiate operation again. Line voltage zero cross detection is possible because the main power source supplied to input terminal 34 is normal household alternating current power.

The normal functions performed by the microcomputer 12 are designed to consume 16 milliseconds (msec.) of a total of 16.7 msec. between zero crossings. The remaining time is defined as a window for the acceptance of the zero crossing signal. The internal timer of the microcomputer 12 operates to predict when the window is opened. When the window is opened the timer is actuated for 16 msec. If the timer completes operation before a zero crossing is detected, then it is determined that an interruption in the supply of power to the terminal 34 has occurred. If no power failure has occurred, the microcomputer 12 repeats the update of the normal system functions. This sequence is known as the main loop cycle.

In the event a power failure occurs, the microcomputer 12 breaks out of the main loop cycle and prepares for an extended period of time for interruption of power from the main source. The first step is to generate a compressed bit pattern of volatile memory containing the user entered data. The compressed bit pattern of the verified portion of volatile memory is stored in the reserved portion of volatile memory.

Now referring to the details of the zero cross sensing circuit 112 as shown in FIG. 2, a low voltage alternating current is supplied from the secondary transformer windings 50 and 52. This voltage is supplied from conductor 116 through resistor 118 which attenuates the voltage before it is fed to the base of transistor 120. The transistor 120 also includes an emitter connected to capacitor 122 and ground 124. A diode 126 is connected between ground 124 and the input to the base of transistor 120. With this arrangement, transistor 120 follows the power line voltage with its collector going through a logic level transition each time the power line goes through approximately zero volts. The diode 126 insures that the applied voltage does not exceed the base emitter breakdown voltage of transistor 120. The capacitor 122 serves as a filter for the collector signal of transistor 120. A regulated voltage $V_{cc}$ (approximately 5 volts) is supplied from the transistor 120 through resistor 128 to terminal 130.

The power supplied from transformer 42 supplies unregulated voltage to the control system 10 of the present invention. A low voltage alternating current is derived from the line voltage transformer and as above described is rectified by diodes 54 and 56. Further the capacitors 58 and 60 serve as filters for the rectified voltage V− and V+. Voltage V+ is supplied for the voltage comparator 88 of the reset circuit 86. Voltage V+ at terminal 84 in the reset circuit 86 is supplied through resistor 132 and conductor 134 to input terminal 136 of comparator 88.

Resistor 138 forms with resistor 132 a voltage divider which biases the negative input terminal 136 of comparator 88 with a voltage level proportional to voltage V+. Positive input terminal 140 of comparator 88 is connected by conductor 142 to resistor 144 and ground 146. Voltage $V_{cc}$ (approximately 5 volts) is supplied from the positive regulated supply from the power source as above identified to a voltage divider formed by resistor 144 and resistor 150. With this arrangement the comparator 88 of the reset circuit 86 compares voltage V+ to voltage $V_{cc}$. As long as the voltage level produced by V+ is greater than the level produced by $V_{cc}$, output terminal 152 of comparator 88 remains at a logic low level which allows the microcomputer 12 to execute the programmed system functions as above identified.

In the event an interruption occurs in the power supplied to the main input terminal 34, capacitor 60 discharges voltage V+. As a result, the voltage level supplied to terminal 84 of the reset circuit 86 and input terminal 136 of comparator 38 is lowered in magnitude to a level which is no longer greater than the magnitude of voltage $V_{cc}$ applied to the comparator input terminal 140 from input terminal 148 The comparator output toggles to a logic high level. A reset signal is transmitted to comparator output terminal 152 through conductor 154 to input terminal 156 of microcomputer 12. Upon receipt of the input signal at terminal 156, the microcomputer 12 is placed in a reset mode. This condition occurs prior to capacitor 60 completely discharging which enables the remaining power stored in the system 10 to be applied to retaining the volatile memory of the microcomputer 12.

With the present invention the volatile memory remains valid at a much lower voltage level and the data is not assumed to be invalid and thereby destroyed in the event of a power interruption. Thus the "data valid time" is extended by virtue of the fact that the volatile memory is verified as being valid rather than assuming that it has become invalid upon an interruption of power to the main input terminal for at least five seconds.

The reset circuit 86 also includes a resistor 158 positioned in a feedback path formed by conductor 160 connected to output terminal 152 and input terminal 140. This feedback path or circuit produces a Schmitt trigger action on the voltage comparator 88 to add noise immunity. In addition capacitor 162 serves as a noise suppressor. Resistor 164 serves as a pullup for the open collector output and is connected to terminal 166 to which voltage is applied at $V_{cc}$. Further with regard to the reset circuit 86, capacitor 168 connected to resistor 170 and ground 172 insures that when power is applied to the system the microcomputer 12 remains in the reset mode until the oscillator circuit 33 stabilizes.

Upon the interruption of power supplied to terminal 152 the comparator 88 is actuated in the above manner to transmit a signal to input terminal 156 of the microcomputer 12 to actuate the microcomputer 12 to (place microcomputer 12 in a reset state) stop the normal system operations and verify the validity of the volatile memory when the microcomputer 10 is once again actuated (released from reset) to resume the normal system operations. As above discussed the volatile memory is divided into a verified portion and an unverified portion. The unverified portion in addition to being reserved for the storage of a compressed bit pattern also stores the fixed bit pattern and the working space used when generating a new compressed bit pattern for comparison.

The verified portion of the volatile memory is reserved for the application variables programmed by the user. This reserve space holds data uncorrupted for as long as possible. In one example volatile memory would include a total memory consisting of six rows of 16, 4 bit locations (where 1 nibble=4 bits). Five rows are reserved for the application as the verified portion, and one row is reserved for the unverified portion. The unverified portion is further divided into three nibbles for the compressed bit pattern, three nibbles for the working registers, six nibbles for the fixed bit pattern, and the remainder are unused.

The 12 bit compressed bit pattern capacity insures that each discrete bit pattern of verified memory is represented by a discrete compressed bit pattern. The nonvolatile memory of the microcomputer 12 is stored in Read Only Memory (ROM) which is more commonly referred to as the program memory using 2048 ten bit words.

Figure 3:
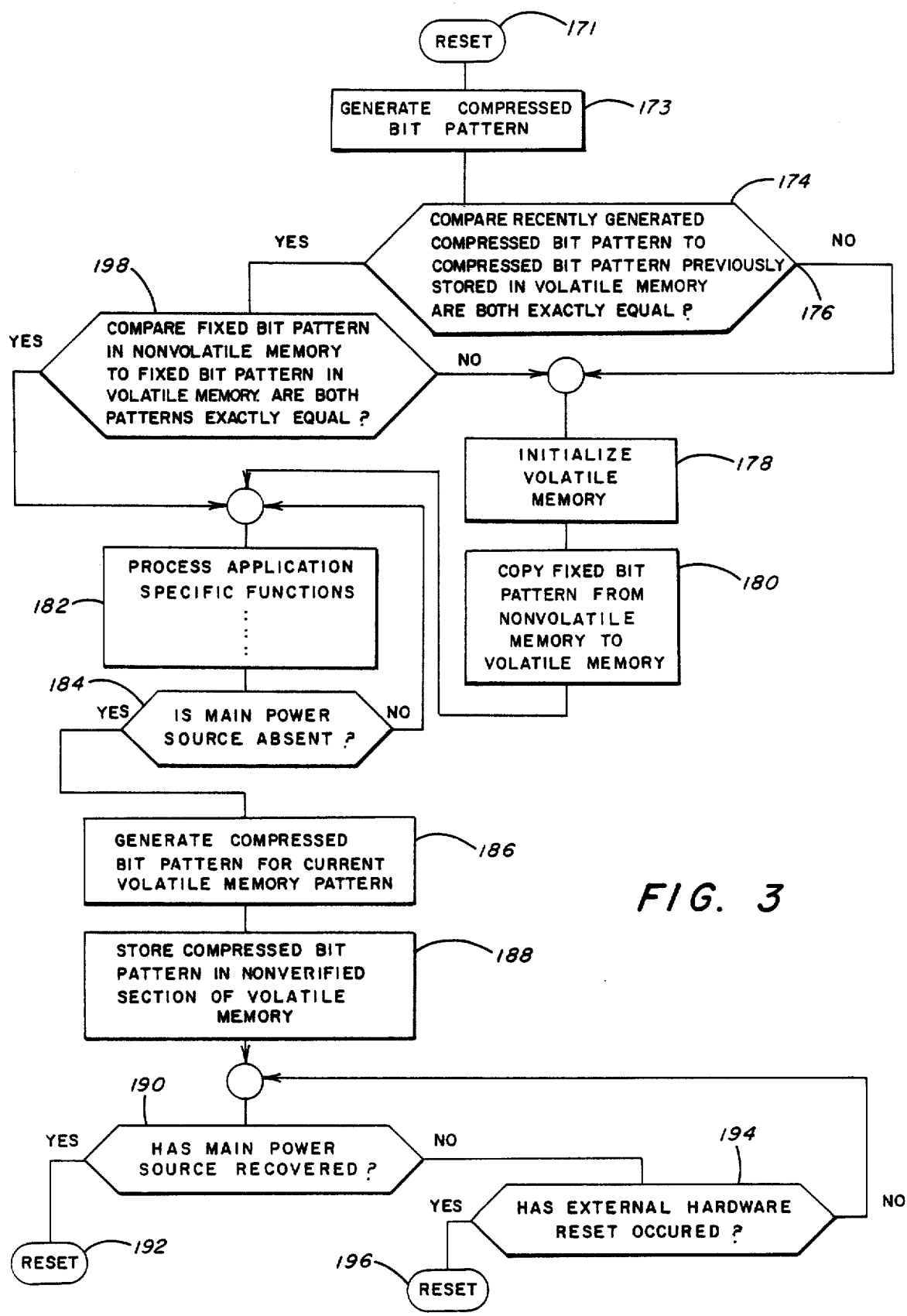
FIG. 3 is a flow chart of the steps in verifying the validity of data in volatile memory of a microprocessor for a preselected period of time following power interruption.

In accordance with the present invention, if the period of time at the main power source supplied to terminal 34 has been interrupted for a period of time greater than the "data valid time", for example ten seconds, the volatile memory of the microcomputer 12 has become invalid. This of course would occur when the microwave oven is unplugged from the wall socket by the user at the input terminal 34. When power has been restored to the input terminal 24, the reset circuit 86 is actuated releasing the microcomputer 12 from the reset mode. Thereafter, the microcomputer 12 begins execution of the program stored in nonvolatile memory. This is diagrammatically illustrated by the flow chart in FIG. 3 at the start point 171 during the reset mode.

In the first portion of the execution of the reset mode a compressed bit pattern representing all the data in the verified portion of the volatile memory is generated at block 173. At block 174 the recently generated compressed bit pattern is compared to a compressed bit pattern that would be stored in the volatile memory prior to the reset mode if data were valid. If data in the volatile memory is at an unknown value because power was interrupted for a period of time greater than the "data valid time", the comparison fails because the bit patterns are not equal. This is determined at point 176. Consequently, the volatile memory is initialized at block 178 to default values. A copy of the fixed bit pattern from nonvolatile memory is then stored in volatile memory at block 180.

Following the copying of the fixed bit pattern from nonvolatile memory to volatile memory at block 180, the microcomputer 12 begins execution of the normal system operations. The display is updated. The keyboard is checked for new entries. The output drive to the magnetron of the microwave oven is controlled. These operations are performed at block 182 illustrated in the flow chart.

After the system operations are completed, the microcomputer determines whether a power failure has occurred. This condition is detected by the absence of a zero crossing signal. Also as above described the normal system operations are designed to consume 16 msec. between zero crossings. In the event the timer finishes its cycle before zero crossing is detected, the power line is considered to have been interrupted. If no power failure has occurred, then the microcomputer 12 repeats update of the normal system functions in a sequence which is referred to as the main loop cycle. The determination of whether or not an interruption has occurred in the main power source is made at block 184.

In the event of a power failure exceeding the selected time interval, the microcomputer 12 diverts from the main loop cycle and begins preparation of operation for a period of time without power from the main source. The first step in preparing for operation in the event of a power interruption takes place at block 186 in the flow chart where a compressed bit pattern of volatile memory is generated. This compressed bit pattern contains user entered data. Thereafter at block 188 the compressed bit pattern of the verified portion of volatile memory is stored in a nonverified portion of the volatile memory.

Data in the volatile memory is validated when the main source of power is restored to the terminal 34. At block 190 it is determined whether or not the main power source has been recovered. An external hardware reset may not necessarily occur as a result of the power failure if the power failure is very short in duration. In the event of the power source recovering before the external hardware reset 194 occurs, evaluation 190 insures that there is always an exit from the infinite loop formed by 190 "no" and 194 "no" to the main loop through reset 170. If the main power has not been recovered, then it must be determined at block 194 whether an external hardware reset has occurred. If so, the microcomputer 12 is returned to the reset mode at block 196. If an external hardware reset has not occurred then the sequence of operation returns to the evaluation made at block 190.

With the present invention the time from the beginning of the power failure to the time at which the microcomputer 12 is placed in the reset mode is minimized by the reset circuitry 86 described above and illustrated in FIG. 2. This is to insure that the maximum possible amount of energy remains stored in capacitors 60 and 104 of the power circuit.

The above described sequence takes place in the event the "data valid time" of the volatile memory has been exceeded. The second condition, of course, occurs when the "data valid time" has not been exceeded. This occurs when the microcomputer 12 is unpowered for a period of time less than the time required to invalidate user entered data. This occurs in the instance when there is a momentary power interruption. Upon the occurrence of a momentary power interruption less than "data valid time", the comparison of the recently generated compressed bit pattern to the compressed bit pattern previously stored in volatile memory which takes place at block 174 is equal. Each time the microcomputer 12 comes out of the reset mode a compressed bit pattern is generated and the comparison at block 174 is executed. Also at block 174, the compressed bit pattern generated after each reset is compared to the bit pattern generated prior to reset.

In the instance of a momentary power interruption, the volatile memory has not been corrupted by the length of time the system was unpowered. The comparison of the two bit patterns are equal. Thereafter, an additional comparison is made at block 198 where the fixed bit pattern in nonvolatile memory is compared to the fixed bit pattern in volatile memory.

In the instance where the volatile memory has not been corrupted the comparisons are equal. An equal comparison indicates that the data in volatile memory is valid. Consequently the microcomputer 12 has survived the power failure without the data being corrupted and the process application functions are executed at block 182. Thus with the present invention the control system 10 provides a flexible method that tolerates variations in all parameters of components.

One parameter that varies by a substantial degree is the voltage level at which the volatile memory of the microcomputer 12 becomes invalid. Variations in this parameter are caused by variations in operating temperature, as well as, by variations in the manufacturing process of the microcomputer 12. These variations are difficult to control. For this reason it has been the conventional practice for microcomputer manufacturers to conservatively specify the voltage at which volatile memory becomes invalid to be 10–20 times greater than can be experimentally observed. With the present invention, a "data valid time" as large as possible will be available with no fixed limits. As a result the volatile memory will remain valid until all available energy is consumed.

According to the provisions of the patent statutes, we have explained the principle, preferred construction and mode of operation of our invention and have illustrated and described what we now consider to represent its best embodiments. However, it should be understood, that within the scope of the appended claims, the invention may be practiced otherwise than as specifically illustrated and described.

We claim:

1. A method for extending valid data time on power failure by verification of volatile memory in a microprocessor comprising the steps of,
    entering user data into the volatile portion of the memory of a microprocessor actuated for data processing,
    transferring an initial fixed bit pattern representative of all the bits of user data from a nonvolatile portion of the memory to the volatile portion of the memory in the event a current fixed bit pattern of user entered data differs from the initial bit pattern,
    conducting a sequence of current data processing operations by the microprocessor,
    evaluating status of power supplied to a microprocessor,
    generating upon an interruption in the supply of power to the microprocessor an initial compressed bit pattern representative of all bits of user data entered in the volatile portion of the memory of the microprocessor,
    storing the initial compressed bit pattern in a nonverified portion of volatile memory of the microprocessor for future reference,
    generating a current compressed bit pattern representative of the current data processing operations entered in the volatile portion of the memory when the power source is restored,
    comparing the current compressed bit pattern in the volatile memory with the initial compressed bit pattern in the nonvolatile memory, and
    continuing the data processing operations as long as the current bit patterns are identical to the initial bit patterns.

2. A method as set forth in claim 1 which includes,
    sensing the presence of current and voltage applied to the microprocessor,
    determining the absence of current and voltage applied to the microprocessor after a preselected interval, and
    generating the compressed bit pattern of volatile memory containing the user entered data upon interruption of current and voltage applied to the microprocessor after the preselected interval.

3. A method as set forth in claim 1 which includes,
    comparing the unregulated voltage from a power source supplied to the microprocessor with a regulated voltage,
    continuing the processing of user entered data by the microprocessor without interruption as long as the unregulated voltage exceeds the magnitude of the regulated voltage,
    interrupting operation of the microprocessor in the event the unregulated voltage decreases in magnitude below the regulated voltage, and
    charging the microprocessor with excess voltage to retain the volatile memory of the microprocessor for a preselected period during which the unregulated voltage is less than the regulated voltage.

4. A method as set forth in claim 1 which includes,
    retaining the voltage memory of the microprocessor for an interval of time of five seconds following an interruption of the supply of power to the microprocessor.

5. A method as set forth in claim 1 which includes,
    actuating the microprocessor to switch in operation from a normal mode to a reset mode for a preselected period of time following the interruption of power to the microprocessor,
    restoring operation of the microprocessor to the normal mode,
    verifying the validity of the volatile memory of the microprocessor, and
    resuming the normal mode of operation of the microprocessor if the volatile memory has been verified as being valid.

6. A method as set forth in claim 1 which includes,
    detecting the presence of a zero crossing signal,
    in the absence of a zero crossing signal for a preselected period of time diverting operation of the microprocessor from a main loop cycle to operation for a period of time without power supplied to the microprocessor, and
    resetting the microprocessor to the main loop cycle in the event the interruption of the power supplied to the microprocessor does not exceed a preselected period of time.

7. A method for verifying the validity of data stored in the volatile portion of the memory of a microprocessor comprising the steps of,
    resetting a microprocessor having volatile and nonvolatile memory to execute data processing functions,
    storing an initial compressed bit pattern corresponding to selected data processing functions in the volatile memory,
    comparing a recently compressed bit pattern with the initial compressed bit pattern stored in the volatile memory,
    copying a fixed bit pattern from nonvolatile memory to the volatile memory in the event the recently compressed bit pattern differs from the initial compressed bit pattern,
    executing the data processing function using the data copied from the fixed bit pattern,
    detecting a periodic interruption in the power supplied to the microprocessor, generating a compressed bit pattern corresponding to the executed data processing functions in the event of a periodic interruption in the supply of power to the microprocessor, storing the compressed bit pattern in a nonverified section of the volatile memory, sensing the restoration of power to the microprocessor, and resetting the microprocessor for data processing functions as directed by the stored and fixed bit patterns in the event the power is interrupted for an undesirable period of time.

8. A method as set forth in claim 7 which includes,
bypassing the reset of the microprocessor for data processing functions in the event the recently compressed bit pattern is the same as the compressed bit pattern previously stored in the volatile memory.

9. A method as set forth in claim 7 which includes,
verifying the validity of the volatile memory of the microprocessor each time power is interrupted to the microprocessor before resetting the microprocessor for data processing functions.

10. A method as set forth in claim 7 which includes,
comparing the fixed bit pattern from nonvolatile memory to the compressed bit pattern from the volatile memory to determine if the bit patterns from nonvolatile and volatile memory are equal.

11. A method as set forth in claim 7 which includes,
initializing volatile memory to default values when the comparison between the recently compressed bit pattern and the initial compressed bit pattern indicates that said bit patterns are not equal.

12. A method as set forth in claim 7 which includes,
detecting an interruption in the power supplied to the microprocessor by the absence of a zero crossing signal.

13. A method as set forth in claim 7 which includes,
validating data in the volatile memory when the main source of power is restored to the microprocessor.

14. A method as set forth in claim 7 which includes,
failing the comparison of the recently compressed bit pattern to the initial compressed bit pattern when the data in the volatile memory is at an unknown value due to a power interruption for a period of time greater than a preselected period of time.

15. A control system for maintaining operation of an electrical appliance for a selected period of time following power interruption comprising, a microprocessor for controlling the functions of an electrical appliance, a power source for supplying an unregulated voltage to said microprocessor, said microprocessor having a volatile memory capable of storing data for a preselected period of time following interruption of the unregulated voltage, a source of regulated voltage, a voltage comparator having a first input terminal, a second input terminal, and an output terminal, said first input terminal connected to the unregulated voltage and the second input terminal connected to the regulated voltage, said comparator output terminal connected to said microprocessor to supply said microprocessor with a voltage at a first level for execution of functions corresponding to the data stored in the volatile memory, said comparator output terminal being biased at said first voltage level as long as the magnitude of the unregulated voltage applied to said first input terminal exceeds the magnitude of the regulated voltage applied to said second input terminal, said comparator being switched from said first voltage level to a second voltage level when the magnitude of the unregulated voltage applied to said first input terminal exceeds the magnitude of the regulated voltage applied to said second input terminal, and said comparator being switched to said second voltage level to maintain the integrity of the volatile memory in said microprocessor for preselected period of time before the volatile memory is destroyed.

16. A control system as set forth in claim 15 which includes,
transistor means for controlling the regulated voltage supplied to said voltage comparator.

17. A control system as set forth in claim 15 which includes,
a reset circuit connected to said comparator output terminal for supplying a reset signal to place said microprocessor in a reset mode.

18. A control system as set forth in claim 15 which includes,
capacitance means connected to said power source for filtering the regulated voltage and storing voltage for said microprocessor in the event of a power interruption.

19. A control system as set forth in claim 15 which includes,
said volatile memory of said microprocessor having a verified portion and an unverified portion, said verified portion being reserved for execution of the functions of the electrical appliance, and said unverified portion being reserved for the storage of a compressed bit pattern, a fixed bit pattern, and working space when generating a new compressed bit pattern for comparison with said fixed bit pattern.

20. A control system as set forth in claim 15 which includes,
a capacitor connected between said unregulated voltage source and said voltage comparator first input terminal, a reset circuit connected between said regulated voltage source and said voltage comparator second input terminal, said capacitor discharging voltage to said voltage comparator in the event of an interruption in the power supplied to said microprocessor, and said comparator being switched to said second voltage level to operate said microprocessor at a lower voltage level and allow discharge of voltage from said capacitor to retain the volatile memory of said microprocessor for at least five seconds after interruption of the supply of power to said microprocessor.

* * * * *

UNITED STATES PATENT AND TRADEMARK OFFICE
CERTIFICATE OF CORRECTION

PATENT NO. : 4,819,237

DATED : April 4, 1989

INVENTOR(S) : James E. Hamilton, et al

It is certified that error appears in the above-identified patent and that said Letters Patent is hereby corrected as shown below:

On the title page, item [54] and column 1, lines 2-4,

In the title, "MICROPROCESS" should read --MICROPROCESSOR--.

Signed and Sealed this

Twenty-sixth Day of December, 1989

Attest:

JEFFREY M. SAMUELS

Attesting Officer     Acting Commissioner of Patents and Trademarks

UNITED STATES PATENT AND TRADEMARK OFFICE
CERTIFICATE OF CORRECTION

PATENT NO. : 4,819,237

DATED : April 4, 1989

INVENTOR(S) : JAMES E. HAMILTON, GREGORY A. PETERSON

It is certified that error appears in the above-identified patent and that said Letters Patent is hereby corrected as shown below:

Column 4, line 13, after "for" insert --monitoring--.

Signed and Sealed this

Fifteenth Day of May, 1990

Attest:

HARRY F. MANBECK, JR.

*Attesting Officer*         Commissioner of Patents and Trademarks